June 12, 1951  A. THALMANN  2,556,347

LIMIT-OF-MOVEMENT CONTROL

Filed May 27, 1946

Inventor:
Alfred Thalmann
by Sommers & Young
Attorneys

Patented June 12, 1951

2,556,347

UNITED STATES PATENT OFFICE 2,556,347

LIMIT-OF-MOVEMENT CONTROL

Alfred Thalmann, Rorschacherberg, Switzerland, assignor to Starrfrasmaschinen A. G., Rorschacherberg, Switzerland Application May 27, 1946, Serial No. 672,492
In Switzerland June 2, 1945

1 Claim. (Cl. 74—110)

Controllers are known for mechanically actuating couplings, wheels, operating levers, cam discs and so on for obtaining limited movements of machine parts, e. g. in feed and high-speed gearing of milling machine tables, movable head stocks, slides, saddles or carriages of horizontal boring machines and lathes, tables of grinding and planing machines and so on. The movements mostly are limited in the desired positions by dogs, cams or corresponding index abutments in rectilinear or rotating disposition. Any change in the machine load in such known prior devices gives origin to a corresponding change in the gearing power. The transmission elements and limit-dogs thus are unequally stressed, and the control or switching forces unfavorably influenced so as to render a precise operation of the control difficult. In mechanical controllers also only simple limitations of movement are possible, which after each switching operation require a corresponding manual operation for reversing the movements, provided that no special auxiliary devices be built in for a stepwise operation of the controller.

In the controller for defining limited movements of machine parts according to my present invention, the control elements are actuated by a hydraulic piston influenced by an operating valve, and the latter co-acts with dogs to select different kinds of gearing operations. One thus succeeds in attaining a uniform, small control force or gearing power and an automatic stepwise control in any sequence desired, even though the power required for actuating the control elements be of different magnitude.

Figure 1:
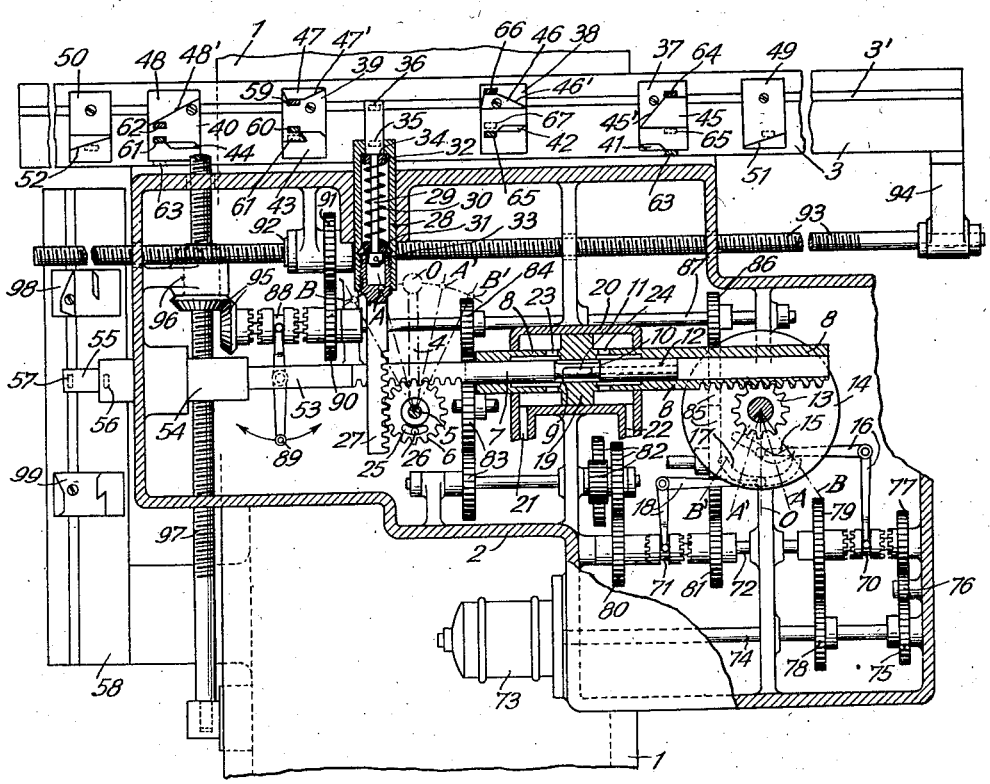
Figure 2:
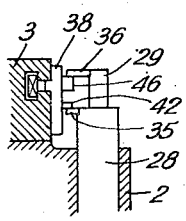

An embodiment of the subject matter of the present invention is shown in the drawing, wherein Fig. 1 is a section through a limit-of-movement control for a machine table movable both horizontally and vertically, and Fig. 2 a cross-section through the top portion of Fig. 1, with a view of the control dogs.

A control box 2 is disposed vertically displaceable on a vertical guide 1, and a carriage 3 is mounted transversely movable on the box 2 and thus forms a machine table movable both horizontally and vertically.

A hand lever 4 is mounted on the control box 2, secured to a shaft 5 to which a wide toothed wheel 6 is keyed. The latter is engaged by the toothed end portion of a control or operating valve 7, the other end of which is displaceably guided in a bore of a piston rod 8. The operating valve 7 is provided with two control rims 9 and 10 and discharge ports 11 therebetween, which latter communicate with an outlet passage 12 formed in the free end thereof. One end of the piston rod 8 is adapted as a rack and engages a pinion 13 connected to a grooved cam disc 14. A groove 15 in the latter is engaged by the end of the one arm of a bell-crank lever 16, the other arm of which engages a clutch 70. A second curved groove 17 in the disc 14 is engaged by the end of the one arm of a second bell-crank lever 18, the other arm of which also engages a clutch 71. A piston 19 is integrally secured to the piston rod 8, and is displaceable in a cylinder 20 provided with two ports 21 and 22 for the admission of pressure liquid from separate sources. The piston rod 8 further is provided with ports 23 and 24 on both sides of the piston 19, through which pressure liquid is fed from the cylinder chambers to the control edges 9 and 10 of the operating valve. When the operating valve 7 is displaced to the right, the flow of pressure liquid from the right-hand cylinder chamber through the port 24 and through the space between the control edge 10 and the adjacent near edge of the piston 19 is increased, and that from the left-hand cylinder chamber through the port 23 and through the space between the control edge 9 and the adjacent near edge of the piston 19 decreased, so that the pressure is raised on the left-hand piston face and lowered on the right-hand piston face, and the piston 19 with the piston rod 8 thus correspondingly is moved to the right over the same distance as the operating valve 7. In the same way, when the latter is displaced to the left, the piston 19 and the piston rod 8 are coercively moved to the left over a corresponding distance. The toothed wheel 6 possesses a circular slot 25 engaged by a stationary detent or stud 26, for limiting the displacement of valve 7 and piston rod 8.

One end of a vertical rack 27 engages the toothed wheel 6, and its other end is integrally connected, by screw threads, to a control element which forms a control sleeve 28. A spring-compressing or tie-pin 29 is displaceably mounted in the latter and is retained by a compression spring 30 and stop discs 31 and 32 between shoulders of the sleeve 28, in that a collar 33 secured to the pin 29 abuts against the stop disc 31, and a shoulder 34 of the pin 29 against the other stop disc 32. The control sleeve 28, according to Fig. 1, is provided with a rearwardly projecting control snug 35, and the tie pin 29 with a lug 36 (Fig. 2). The said snug 35 and lug 36 co-operate with control and compressing dogs of cam plates adjustably mounted on the carriage or saddle 3 in the longitudinal groove 3' (Fig. 2). Four cam plates 37—40 are provided for, each comprising a control dog 41—44 and an associated cocking or tensing dog 45—48. The latter are provided with inclined faces 45'—48' by which the pin 29, when coacting with the lug 36, is raised relative to the control sleeve 28, thus compressing the spring 30. The sleeve 28 is prevented from being raised by virtue of the control snug 35 cooperating with the appurtenant control dog 41—44. As soon as, however, the control snug 35 slips off the edge of a control dog, the control bush 28 and its rack stem 27 is displaced through the action of the tensed spring and thus displaces the operating valve 7. The setting of the sleeve 28 is limited by either letting the snug 35 abut against a face of the associated compressing dog or by the detent 26 contacting the end wall of the slot 25 in the toothed wheel 6.

Two cam plates 49, 50 yet are provided on the two ends of the carriage 3, which comprise a control lug 51, 52 each co-operating with the control snug 35 and bringing the control sleeve 28 into the zero position in order to finally stop the mechanism.

The toothed wheel 6 further is engaged by a rack 53 connected to a control sleeve 54 which is adapted similar to the control sleeve 28 and co-operates with a tensing pin 55. The control snug 56 secured to the control sleeve 54 and the control lug 57 provided on the tensing pin 55 coact with dogs provided on cam plates 98, 99 secured to the machine part 58 which is fastly mounted on the guide 1, which cam plates are adapted similar to the ones (37—40) mounted on the carriage 3.

The clutches 70 and 71 cooperating with the bell-crank levers 16 and 18 are mounted on a jack shaft 72 driven by a motor 73 and shaft 74 over a gear train 75—77, in the one sense of rotation upon moving the disengaging clutch 70 to the right, and over a gear train 78, 79 in the other sense of rotation upon moving the clutch 70 to the left. The clutch 71, upon being moved by the bell-crank lever 18, engages one of the gear wheels 80 or 81 mounted loose on the shaft 72 with the latter. The wheel 80 engages a reduction gear 82 which, by way of a gear train 83—84, transmits as feed gear the torque onto a bus shaft 87. The wheel 81, on the other hand, transmits the torque, over a direct gear 85—86 acting as high-speed gear, onto the bus shaft 87. At any one time, either the one or the other of the gears 82 and 85—86 is in operative engagement, according to the position of the clutch 71.

The bus shaft 87 transmits its torque onto a third clutch 88 mounted displaceable thereon and manually operated by a lever 89. When thrown into engagement with the gear wheel 90, the clutch 88 transmits the torque over a gear wheel 91 onto the clasp nut 92 mounted on the box 2 and secured to the wheel 91. The said nut engages the threaded spindle 93 journaled in a lug 94 of the carriage 3, and thus moves the latter horizontally relative to the box 2.

When the third clutch 88 is in engagement with the bevel gear 95 and thus with the clasp nut 96, the entire control box 2 is moved vertically over the threaded spindle 97.

According to the position of the levers 16 and 18, which are actuated by the control mechanism, and of the manually operated lever 89, either the control box 2 with the carriage 3 immovable thereon is vertically displaced or else the carriage 3 moved horizontally relative to the stationary control box 2. The lever 16 controls the sense of rotation, e. g. the direction of movement, and the lever 18 the feed speed or the high-speed movement.

The control device shown operates as follows:

It is assumed that clutch 88 is thrown into engagement with the gear wheel 90 so that the carriage 3 is horizontally moved relative to the box 2 by the bus shaft 87. When swinging the operating lever 4 from the position O into the position A, the operating valve 7 is moved to the left, the piston rod 8, owing to the displacement of the control edges 9 and 10, being displaced to the left for the same distance in the manner indicated. The cam disc 14 thus is turned from the zero position shown into the position A, and the bell-crank lever 16 consequently clockwise, while the crank lever 18 is not turned, i. e. the reduction gear 80—84 remains engaged as shown. The carriage 3 thus, e. g., moves at slow speed to the left, the clutch 70 and shaft 72 being engaged by the wheels 78, 79. When, now, the hand operating lever 4 is thrown from the position A into the position B, the cam disc 14 is correspondingly brought into the position B, the reversing lever 16 being not further rocked, while the lever 18 throws the clutch 71 and shaft 72 into engagement with the wheel 81, whereby the carriage 3 is moved to the left in high gear. When swinging the hand operating lever 4 into the position A', the reversing lever 16 is rocked counter-clockwise, while the lever 18 remains in its position. The carriage 3 thus is moved to the right at slow speed. When swinging the operating lever 4 into the position B' the reversing lever 16 remains in its position while the operating lever 18 is rocked counter-clockwise to throw the bus shaft 87 and thus the spindle 93 into high. The carriage 3 thus moves to the right in high. The gear thus may be manually reversed, as desired, by means of the hand operating lever 4, the control power required for operating the lever 4 being very small and always approximately constant even tho' the operating force be variable.

The carriage 3 may be controlled automatically by using the cam plates 37—40 after the hand operating lever 4 has been moved manually from the position O to one of the positions A, B, A' or B'. When the lever 4 e. g., has been swung into the position B', the carriage 3 is moving to the right in high, in the manner described. The control bush 28 and the tensing pin 29 with the control snug 35 and the tensing lug 36 (with lever 4 in B') have been moved upwardly into their topmost position, i. e. higher than shown in the drawing. When the carriage 3 travels to the right, the bevel face 47' of the tensing dog 47 on the cam plate 39 co-acts with the tensing lug 36, while at the same time the control dog 43 co-acts with the control snug 35. The tensing pin 29 thus is depressed by the action of the bevel face 47' on the tensing lug 36, while the control bush 28, due to the control snug 35 running up on the control dog 43, is held in its position. The spring 30 thus is tensed. The tensing lug 36 arrives in the position 59, and control snug 35 in the position 60. As soon as the control snug in this latter position moves away from the control edge of the control dog 43, the control bush 28 is depressed by the tensing spring 30, and its snug 35 is brought into the position 61 wherein it again is contacted by a face of the control dog 43. Owing to the downward displacement of the control bush 28, the control valve 7 and the cam disc 14 have been moved into the position A', and the carriage drive is thrown into second or reduced speed. The carriage 3 still moves to the right, until the cam plate 40 coacts with the control and the tensing lugs 35 and 36. The latter is depressed from the position 59 into the position 62 by the bevel face 48' of the tensing dog 48, whilst the control snug 35 remains in the position 61 by virtue of the control dog 44 lying at the same elevation as the second stage of the dog 43, thus the spring 30 is again tensed. When the control snug moves off the control edge of the dog 44, it is depressed from the position 61 into the position 63, together with the bush 28. The latter turns the cam disc 14 into the position B, by way of the control valve 7, i. e. the carriage 3 moves to the left in high. Such position 63 and B is limited by the abutment of the stud 26 against the left end of the slot 25 in the toothed wheel 6. In this position 63 and 62 (the lowest position of bush 28 and pin 29) of the control snug 35 and of the tensing lug 36 respectively, the carriage 3 moves in high to the left up to the cam plate 37 past and between all dogs of the cam plates. Here the tensing lug 36 is raised from the position 62 into the position 64 by the bevel face 45' of the tensing dog 45, whilst the control snug 35 remains in the position 63, being caught therein by the dog 41, until it slips off the edge thereof and the control bush 28 is moved into a position corresponding to the position A' of the cam disc 14 by means of the tensed spring 30, the control snug 35 being raised from the position 63 into the position 65. In such position A', the carriage 3 moves feeding to the right, at reduced speed, up to the cam plate 38. On the latter, the tensing lug 36 is raised from the position 64 into the position 66 by the bevel face 46' of the tensing dog 64, and the tensing spring 30 is tensed, whilst the control snug 35 remains held in the position 65 by the control dog 42 until it slides off the control edge, whereupon the control bush 28 is set by the tensed spring so that the control snug arrives in its topmost position 67. The latter is limited by the abutment of the stud 26 against the right-hand end of the slot 25 in the toothed roller 6. To this position 67 of the control snug 35 corresponds the position B' of the cam disc 14, i. e. to the right-hand high speed motion of the carriage 3 which, now, moves up to the cam plate 39, where the automatic cycle described starts anew. Such automatic control operation is continued until the movement of the carriage 3 is stopped by setting the hand-operated lever 4 into the zero position.

When correspondingly disposing the cam plates, the same control operations also may be effected in reversed or other sequence.

Further, after setting the lever 89 by hand, the clutch 88 may be engaged with the bevel gear 95. The camming of the lugs 56, 57 with the cam plates 98, 99 adjustably mounted on the stationary machine part 58, permits automatic control of the vertical movement of the control box 2.

The control device described may be applied, in a very practical and time-saving manner, to milling machines in particular.

What I claim and desire to secure by Letters Patent is:

In a movement limiting mechanism for a machine tool carriage transversely movable relatively to a control casing, a control sleeve carried by said casing and movable at right angles to the direction of movement of said carriage, a tie-bolt extending into said sleeve and longitudinally movable relatively to the sleeve, abutment means within said sleeve for limiting the movement of the tie-bolt with respect to the sleeve, spring means within said sleeve tending to maintain said sleeve and tie-bolt in a predetermined normal position, a control dog on said sleeve, a control dog on said tie-bolt, a series of cam plates adjustably mounted on said carriage and spaced in the direction of movement of the carriage, each of said cam plates being provided with a cam surface adapted to cooperate with said control dog on the tie-bolt to move the tie-bolt relatively to said control sleeve and energize said spring means, and each cam plate having a second cam surface adapted to cooperate with said control dog on the sleeve to hold said sleeve during energizing of said spring means upon coaction of said first mentioned cam surface and control dog, said two cam surfaces on a cam plate being positioned relatively to each other so that for the purpose of initiating a change of movement of said carriage the first mentioned cam surface of a cam plate first coacts with the control dog on said tie-bolt and when said spring means are tensioned said cam surface releases the control dog on said sleeve to obtain a sudden control movement of the sleeve by the action of said spring means.

ALFRED THALMANN.

REFERENCES CITED

The following references are of record in the file of this patent:

UNITED STATES PATENTS

| Number | Name | Date |
|---|---|---|
| 1,577,206 | Dempster | Mar. 16, 1926 |
| 1,790,550 | Mathewson | Jan. 27, 1931 |
| 1,969,231 | Nenninger et al. | Aug. 7, 1934 |
| 2,240,506 | Levesque et al. | May 6, 1941 |
| 2,322,340 | Bechler | June 22, 1943 |
| 2,352,183 | Bullard | June 27, 1944 |